(12) United States Patent
Murakami

(10) Patent No.: US 6,223,696 B1
(45) Date of Patent: May 1, 2001

(54) DOG'S CLOTHES

(75) Inventor: Satoshi Murakami, Detomachi (JP)

(73) Assignee: Kim Yon Oku, Zenrahokudo (KR)

( * ) Notice: Subject to any disclaimer, the term of this patent is extended or adjusted under 35 U.S.C. 154(b) by 0 days.

(21) Appl. No.: 09/518,418

(22) Filed: Mar. 3, 2000

(30) Foreign Application Priority Data

Mar. 5, 1999 (JP) .................................................. 11-058696

(51) Int. Cl.[7] .................................................. H01K 13/00
(52) U.S. Cl. .................................................. 119/850
(58) Field of Search ......................... 2/69, 272; D30/145; 119/850; 54/27, 79.2

(56) References Cited

U.S. PATENT DOCUMENTS

| | | | | |
|---|---|---|---|---|
| D. 312,151 | * | 11/1990 | Dickey ................................ | D30/145 |
| D. 374,315 | * | 10/1996 | Caditz ................................. | 119/850 |
| D. 379,686 | * | 6/1997 | Caditz ................................. | D30/145 |
| D. 397,533 | * | 8/1998 | Lidis ................................... | D30/145 |
| D. 427,734 | * | 7/2000 | Balzarini ............................ | D30/145 |
| 1,595,834 | * | 8/1926 | Griffiths ............................. | 119/850 |
| 1,772,827 | * | 8/1930 | Caster-Udell ...................... | 54/79 |
| 2,103,109 | * | 12/1937 | De Mar .............................. | 54/79 |
| 2,222,705 | * | 11/1940 | Conlon ............................... | 54/79 |
| 2,417,803 | * | 3/1947 | De Mar .............................. | 54/79 |
| 3,150,641 | * | 9/1964 | Kesh ................................... | 119/160 |
| 3,742,679 | * | 7/1973 | Jordan ................................ | 54/79 |
| 3,762,073 | * | 10/1973 | Cantales ............................. | 36/2.5 P |
| 3,895,628 | * | 7/1975 | Adair .................................. | 128/171 |
| 3,918,238 | * | 11/1975 | Iozzio ................................. | 54/79 |
| 4,355,600 | * | 10/1982 | Zielinski ............................. | 119/143 |
| 5,341,765 | * | 8/1994 | McComb ............................ | 119/850 |
| 5,359,963 | * | 11/1994 | Jesse, Jr. et al. ................... | 119/850 |
| 5,426,925 | * | 6/1995 | Smargiassi ......................... | 54/79.1 |
| 5,458,094 | * | 10/1995 | Proshan .............................. | 119/850 |
| 5,463,985 | * | 11/1995 | Shover ................................ | 119/850 |
| 5,537,954 | * | 7/1996 | Beeghly et al. .................... | 119/850 |
| 5,839,395 | * | 11/1998 | Kelley et al. ....................... | 119/850 |
| 6,024,055 | * | 2/2000 | Jesse, Sr. et al. ................... | 119/850 |
| 6,058,890 | * | 5/2000 | Harrell ................................ | 119/850 |
| 6,070,557 | * | 6/2000 | Hibbert ............................... | 119/850 |
| 6,089,194 | * | 7/2000 | LaBelle .............................. | 119/850 |

* cited by examiner

*Primary Examiner*—John J. Calvert
*Assistant Examiner*—Alissa L. Hoey
(74) *Attorney, Agent, or Firm*—Dike, Bronstein, Roberts & Cushman, LLP; David G. Conlin; David A. Tucker

(57) ABSTRACT

The invention is to provide dog's clothes which are very familiar with the motions of the shoulder and waist accompanying the walk of a dog, are adhered closely to the lower belly and does not hinder movements of the four legs, wherein the invention is constructed so that a front edge which is made arc-shaped to the curvature around the neck and a rear edge which is also made arc-shaped to the curvature around the body from the waist part to the lower belly are provided at the front (chest part) to such a degree that these cover an area from the neck part to the lower belly of a dog, wherein parts in the vicinity of both side edges of the front (chest part) and said front and rear edges are made into a shoulder suspension part and a waist suspension part; respective tip ends of said shoulder suspension part and waist suspension part are made so as to be connected to or separated from each other at a degree of overlapping freedom; and front and rear leg parts into which four legs are inserted are made through to said front (chest part).

2 Claims, 2 Drawing Sheets

DOG'S CLOTHES

TECHNICAL FIELD

The present invention relates to clothes to be worn on pets such as cats or dogs (hereinafter called a dog).

PRIOR ARTS

A pet dog is made to wear clothes in order to prevent it from being stained or soiled during exercise or due to rain or snow. The clothes are devised so as to cover the chest part, belly, and four legs which are mainly stained or soiled during walking exercise. However, since little support was provided in view of movements of frame muscle, countermeasures for exercise were insufficient.

SUMMARY OF THE INVENTION

The present invention was developed to solve the above shortcomings or problems, and it is therefore an object of the invention to provide dog's clothes which are very familiar with motions of the shoulder and waist accompanying a dog's walk, is adhered closely to the lower belly and does not hinder movements of the four legs.

In order to achieve the abovementioned object, a dog's clothes according to the invention are featured in that a front edge which is made arc-shaped to the curvature around the neck and a rear edge which is also made arc-shaped to the curvature around the body from the waist part to the lower belly are provided at the front (chest part) to such a degree that these cover an area from the neck part to the lower belly of a dog, wherein parts in the vicinity of both side edges of the front (chest part) and said front and rear edges are made into a tongue-shaped shoulder suspension part and a tongue-shaped waist suspension part; respective tip ends of said shoulder suspension part and waist suspension part are made so as to be connected to or separated from each other at a degree of overlapping freedom; and front and rear leg parts into which four legs are inserted are made through at said front (chest part), and wherein the respective lower parts of the front and rear leg parts are provided with a straight-up ribbed band.

BRIEF DESCRIPTION OF THE DRAWINGS

The foregoing and other features and advantages of the present invention will become more readily more appreciated as the same becomes better understood by reference to the following detailed description when taken into conjunction with the accompanying drawings, wherein.

PREFERRED EMBODIMENT OF THE INVENTION

Needless to say, a size of a dog's clothes according to the invention is selected and determined in accordance with a frame or build of a dog, that is, the body length, height, and/or a difference in plumage, etc. And, connecting pieces at the shoulder suspension part and waist suspension part, and straight-up ribbed bands at the lower end of the legs may be adequately selected among joining tapes, strings, bands, etc. Also, a waterproof and durable material of the front (chest part) may be employed.

Figure 1:
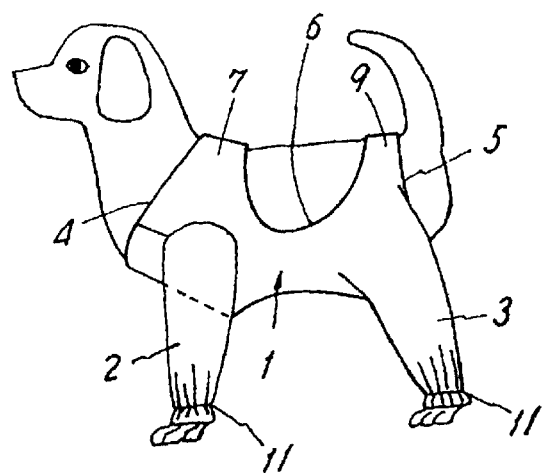
FIG. 1 is a side elevational view showing a dog wearing dog's clothes according to the invention.
Figure 3:
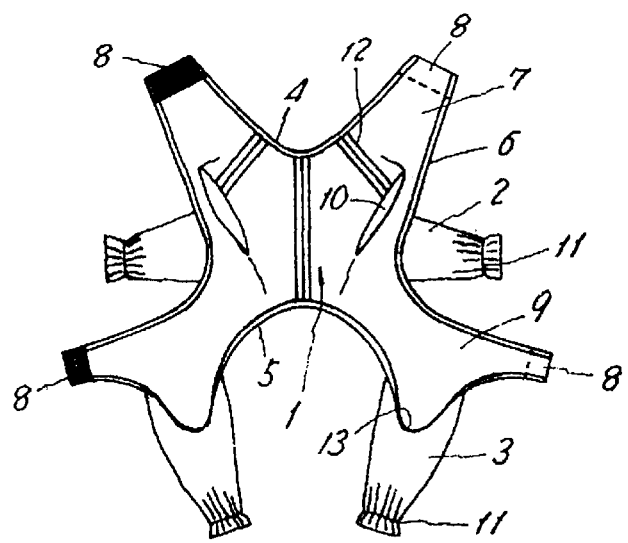
FIG. 3 is an exploded plan view of dog's clothes according to the invention, which is observed from the inside of the clothes.
Figure 4:
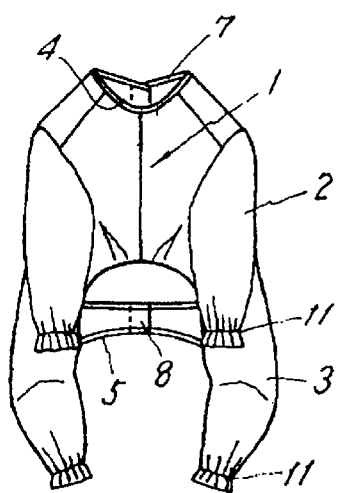
FIG. 4 is a front elevational view in which a dog wears dog's clothes according to the invention.

A description is given of a preferred embodiment with reference to the accompanying drawings. FIG. 1 is a side elevational view showing a dog wearing clothes according to the invention. The front leg parts 2 and rear leg parts 3 are connected to the front (chest part) 1, and the front edges of the front (chest part) 1, and the rear edges thereof are mutually connected to each other on the shoulder part and waist part of the dog at a degree of overlapping freedom. In detail, the front (chest part) 1 is a cloth to cover the underside of the dog body when walking, and as shown in FIG. 1, the front edge 4 of the front (chest part) 1 corresponding to the neck from the shoulder to the chest of a dog is made arc-shaped, as shown in FIG. 3, in compliance with the configuration around the neck while the rear edge 5 of the front (chest part) 5 corresponding to the body from the waist to the lower belly is made arc-shaped in compliance with a curvature of the body. The left and right side edges 6 of the front (chests part) 1 are also made arc-shaped so as to be along the sides of the body from the shoulder to the waist. The front (chest part) 1 is also devised so that a part in the vicinity of the front edge 4 and rear edge 6 is made into a tongue-shaped suspension part 7, wherein the front (chest part) 1 is caused, by the connecting pieces 8 at both lower end parts, to suspend from the chest of a dog in such a state where the front (chest part) 1 is brought into contact with the chest and shoulder of the dog. A part in the vicinity of the rear edge 5 and side edge 6 is made into a tongue-shaped suspension part 9, wherein the front (chest part) 1 is caused, by the connecting pieces 8 at both side edges, to suspend from the lower belly of a dog in such a state where the front (chest part) 1 is brought into contact with the lower belly and waist of the dog.

Next, the front edge parts 2 are made through to the front left and right of the front (chest part) 1 while the rear leg parts are made through to the rear left and right. In FIG. 3, 10 indicates throughholes for the front legs. Both-leg parts 2 and 3 are made cylindrical to ensure that movements of the legs of a dog can be free, wherein straight-up ribbed bands 11 are provided at the lower end part which is in contact with the wrist.

Figure 2:
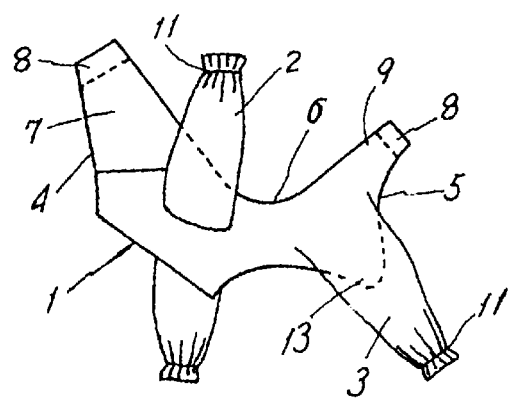
FIG. 2 is a side elevational view showing a state where a dog is omitted in FIG. 1 with one of the front legs raised.

The arc-shaped edge of the rear edge 5 of the front (chest part) 1 is cut open to such a degree that the arc-shaped edge does not hinder urinating and/or evacuating, thereby preventing the clothes from being stained, and this is selected on the basis of whether the dog is male or female. The circumferential edge of the front (chest part) 1 is hemmed to attempt adhesion to the body. Also, in FIG. 3, 12 indicates a seam. In FIGS. 2 and 3, 13 indicates a portion which is brought into contact with the inside of the thigh of the rear legs.

When causing a dog to wear clothes according to the invention, front and rear and left and right legs are inserted into leg portions 2 and 3, and the shoulder suspension part 7 and waist suspension part 9 are lifted up onto the back of the dog while selecting the overlapping degree of the connecting pieces 8, and fixed on the back.

In a correctly worn state, the front (chest part) 1 is adhered closely to the entire part from the chest part of a dog to the belly thereof, and the adhering can be sustained in pursuit of movements of the dog. That is, the shoulder suspension part 7 and waist suspension part 9 are separated so as to pursue the respective movements of the shoulder and waist, resulting from motions of the front and rear legs of a dog, whereby the front (chest part) 1 is caused to adhere closely to the lower belly. On the contrary, the front and rear leg parts 2 and 3 are caused to communicate with the front (chest part) 1 and are in a freely suspended state. Therefore, these do not hinder motions of the legs.

Clothes according to the invention have such an effect as not to hinder walking of a pet cat or a pet dog, and can prevent it from being stained or soiled due to direct rebounding onto the underside of the body in puddles, and can prevent the body from being wetted when washing the wrists and feet.

What is claimed is:

1. Dog's clothes comprising:
    (a) a main portion adapted to fit against the front of a dog including its chest, shoulders, hips and belly, said main portion defining an area bounded by:
        (i) an arc-shaped front edge having a first right end, a first left end and a curvature adapted to fit around a front portion of the neck of said dog;
        (ii) an arc-shaped rear edge having a second right end, a second left end and a curvature adapted to fit around the belly of said dog such that urination and/or evacuation by said dog is not hindered and said clothes will not be soiled thereby in the course of the normal use; and,
        (iii) curved left and right side edges respectively connecting said first and second left ends and said first and second right ends, each said side edge being adapted to extend along a side of said dog between its shoulders and hips;
    (b) a pair of front suspension portions respectively attached to, and extending outwardly from, said left and right side edges of said main portion adjacent to said front edge, each said front suspension portion defining a forwardly facing edge adapted to fit against a rear portion of the neck of the dog and having a tip end, said tip ends being respectively adapted for selective overlapping engagement and disengagement with one another when said front suspension portions extend around the back of said dog in substantial alignment with its shoulders such that said main portion is removably securable against the chest and shoulders of said dog;
    (c) a pair of rear suspension portions respectively attached to, and extending outwardly from, said left and right side edges of said main portion adjacent to said rear edge in spaced relation to said front suspension portions, each said rear suspension portion having a tip end, said tip ends being respectively adapted for selective overlapping engagement and disengagement with one another when said rear suspension portions are extended around the back of said dog in substantial alignment with its hips such that said main portion is removably securable against the hips and belly of said dog;
    (d) a pair of generally cylindrical hollow front leg parts each having an open inner end and an open outer end, said inner ends opening respectively into areas of said main portion generally adjacent to the joiner of the said first suspension portions thereto such that said front leg parts are adapted to receive and cover the front legs of said dog without impediment to the free movement thereof relative to the body of said dog; and,
    (e) a pair of generally cylindrical hollow rear leg parts each having an open inner end and an open outer end, said inner ends opening respectively into areas of said main portion generally adjacent to the joiner of said second suspension portions thereto such that said rear leg parts are adapted to receive and cover the rear legs of said dog without impediment to the free movement thereof relative to the body of said dog;
    whereby when said dog is dressed in said clothes neither the natural movement of its legs, nor the natural movement of its shoulders, back and/or waist, are inhibited by said clothes.

2. Dog's clothes as set forth in claim 1, wherein a portion of each said leg part adjacent to said open outer end thereof comprises a plurality of substantially axially disposed spaced ribs whereby each said leg part radially elastically engages the wrist portion of the one of the legs of said dog inserted therein during use of said clothes.

\* \* \* \* \*

UNITED STATES PATENT AND TRADEMARK OFFICE
CERTIFICATE OF CORRECTION

PATENT NO.    : 6,223,696 B1
DATED         : May 1, 2000
INVENTOR(S)   : S. Murakami et al.

It is certified that error appears in the above-identified patent and that said Letters Patent is hereby corrected as shown below:

<u>Title page,</u>
Item [73], Assignees: please add -- Satoshi Murakami, Detomachi (JP) --

Signed and Sealed this

Seventh Day of January, 2003

JAMES E. ROGAN
*Director of the United States Patent and Trademark Office*